Aug. 21, 1923.
W. T. RUTLEDGE
HOSE CLAMP
Filed Aug. 16, 1922
1,465,792
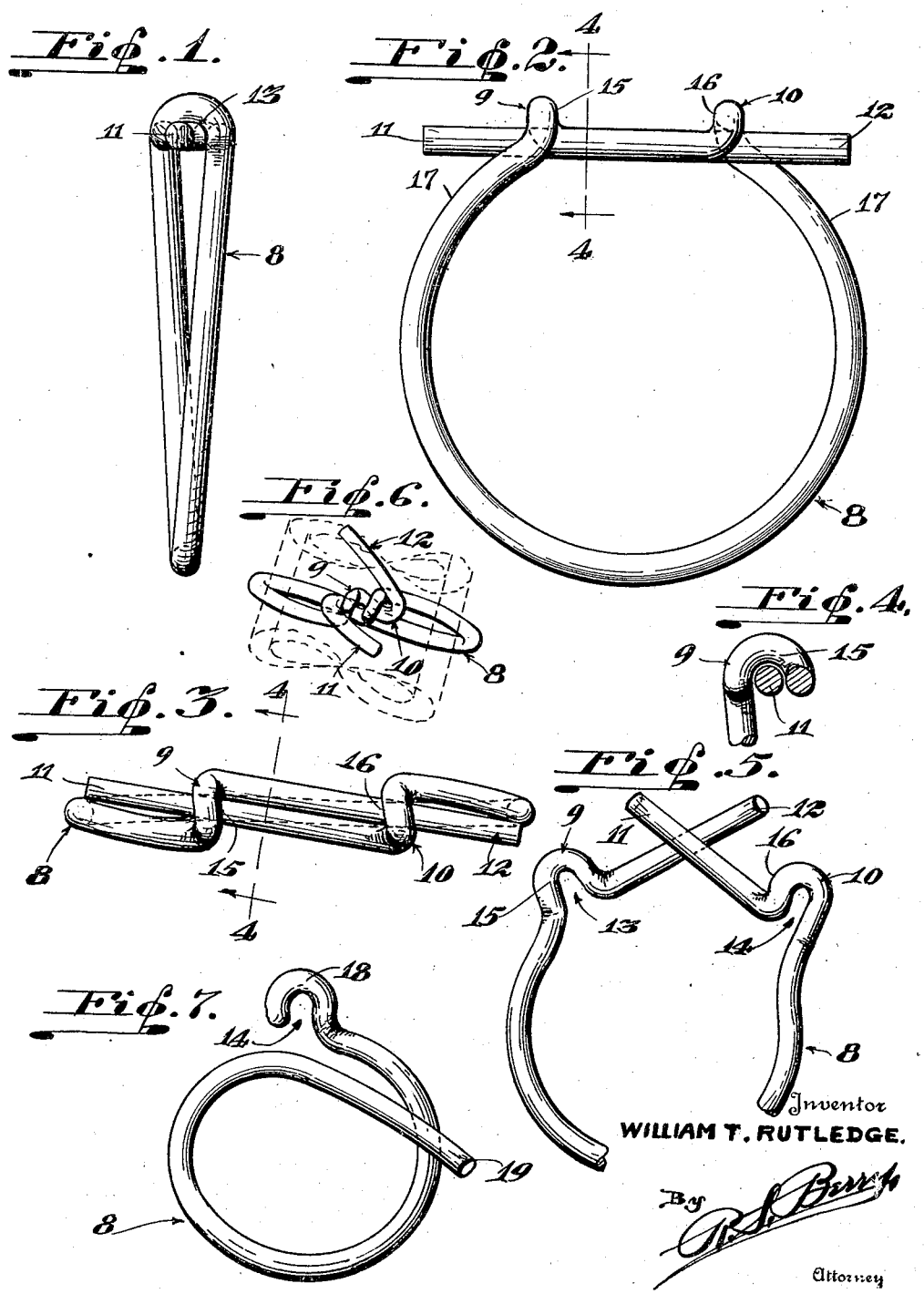
Inventor
WILLIAM T. RUTLEDGE.

Patented Aug. 21, 1923.

1,465,792

UNITED STATES PATENT OFFICE.

WILLIAM T. RUTLEDGE, OF SANTA ANA, CALIFORNIA.

HOSE CLAMP.

Application filed August 16, 1922. Serial No. 582,245.

*To all whom it may concern:*

Be it known that I, WILLIAM T. RUTLEDGE, a citizen of the United States, residing at Santa Ana, in the county of Orange and State of California, have invented new and useful Improvements in Hose Clamps, of which the following is a specification.

This invention relates to a hose clamp of the type which is especially adapted for use in fastening a hose on a metallic nipple such as in attaching the flexible tube between the engine and radiator in automobile construction, and which is also serviceable in fastening flexible coverings on pipes as in covering a pipe with sheet insulation.

An object of my invention is to provide a clamp of the above character which may be formed solely of wire in such manner that it may be drawn tight and securely fastened in a clamping position by connecting the end portions of the wire so as to obviate the use of bolts and similar fastenings as commonly employed in devices of this character.

Another object is to provide a hose clamp which is so formed that a continuous inner wall of smooth surface will contact the hose so that as the clamp is tightened the surface and walls of the hose will not be torn, and in which a rounded surface will be presented to the hose.

With the foregoing objects in view, together with such other objects and advantages as may subsequently appear, my invention consists in the novel construction hereinafter described and claimed and illustrated in the accompanying drawings, in which:

Figure 1 is an end view of a hose clamp formed in accordance with my invention;

Figure 2 is a side view;

Figure 3 is a plan view;

Figure 4 is a sectional detail as seen on the line 4—4 of Figures 2 and 3;

Figure 5 is a perspective view showing the end portions of the clamp as free;

Figure 6 is a perspective view showing the clamp as fastened on a hose;

Figure 7 is perspective view of a modified form of the clamp.

More specifically 8 indicates a single strand of heavy wire formed in a coil having hooks 9 and 10 bent thereon so as to provide straight end portions 11 and 12 extending from the hooks. The hooks 9 and 10 are bent at about right angles to the sides of the coil; the hook 9 projecting from one side of the coil and the hook 10 projecting from the other side thereof so that the hooks will readily overlap the end portions 11 and 12. The hooks also project substantially at right angles from the outer periphery of the coil in alignment with each other to form aligned notches 13 and 14 opening radially to the center of the coil, and so that the outer faces 15 and 16 of the hooks will face each other and will lay evenly against one another when brought together.

The free ends 11 and 12 of the coil are designed to be positioned in the notches 13 and 14 and drawn therethrough so that the ends will extend from the opposite sides of each hook and project tangentially from the curvature 17 of the coil a distance beyond the hooks.

In the operation of placing and tightening a clamp thus formed on a hose, it may be slipped over the end of the hose or the coil may be opened and brought around the hose after the latter is in position to be clamped and the ends 11 and 12 inserted through the hooks 9 and 10 after which the free ends of the portions 11 and 12 extending beyond the hooks are pulled in opposite directions until the tension on the hose is seen to be sufficient for sealing the hose whereupon the projecting ends 11 and 12 are bent outwardly from the hose and around the hooks as shown in Figure 6 thereby securely fastening the coil to the hose and clamping the hose firmly on the nipple. The end portions 11 and 12 extending between the hooks will then lie in continuation of the coil 8 so that a continuous peripheral contact is had completely around the hose.

Where suitable the clamp may be formed with a single hook 18 and a single projecting end 19 as shown in Figure 7; the hook being formed at one end of the wire and bent at right angles thereto so as to extend over the free end when the latter is arranged alongside the coil, the free end being bent around the stem portion of the hook in effecting engagement therewith.

I claim:

1. A hose clamp comprising a single length of wire curved into a single coil with hooks formed near each end thereof leaving free ends of wire extending from said hooks, the hooks being bent outwardly and radially from the periphery of said coil and twisted to extend at right angles to the sides of said coil thereby forming notches open to the inside of said coil.

2. A hose clamp comprising a single length of wire bent into a single coil with hooks formed near each end thereof and having free end portions extending from the hooks, said hooks being bent outwardly and radially from the periphery of said coil and twisted so as to extend at right angles from the opposite sides of said coil and forming notches opening to the inside of the coil, the free ends of the wire being adapted to be disposed in said hooks and to be bent around the stem of the hooks.

WILLIAM T. RUTLEDGE.